United States Patent Office 3,704,133
Patented Nov. 28, 1972

3,704,133
POPCORN PRODUCT
Paul Kracauer, 210 W. 90th St., New York, N.Y. 10024
No Drawing. Filed June 8, 1970, Ser. No. 44,620
Int. Cl. A23l 1/10
U.S. Cl. 99—83
9 Claims

ABSTRACT OF THE DISCLOSURE

The invention relates to a new product of corn kernels which upon popping in the ordinary manner, i.e. a closed container, results in popcorn which is uniformly flavored, e.g. with shortening and salt, with sugar, with candy flavor or with cheese. This is accomplished by mixing the corn kernels with shortening, a lipophilic surfactant and with water prior to the popping.

BACKGROUND OF THE INVENTION

Popcorn is a very old and well known product. Flavored popcorn is also known. However, the flavoring of popcorn, e.g. by the addition of butter, or by coating with brown sugar, or the like, has ordinarily been accomplished after the corn kernels have been popped.

While this might be satisfactory for sale of the finished product, it is not satisfactory where a product for home preparation is sold. Thus, in recent years, a very popular product has been a popcorn product for home use in which corn kernels are contained in a sealed aluminum pan which is covered with an expansible aluminum top. When the pan is heated and the popcorn pops, the increased volume of popping corn is accommodated by expanding of the aluminum top. Pan constructions for making of popcorn in this manner are described in U.S. Pat. 2,791,350, U.S. Pat. 2,815,883, and U.S. Pat. 3,054,680.

In connection with these home popping products, it has not been possible to obtain sugar coated or cheese coated products, it has not always been possible to obtain uniform flavoring of the resulting popcorn.

Furthermore, in connection with the packaging of home popping products the corn kernels packed therein have always been packed dry because it is well known that the water content of the kernels for satisfactory popping is absolutely critical. Thus, excess water can prevent satisfactory popping, and if the kernels are too dry, they will not pop satisfactorily. It is also known that dried kernels cannot be uniformly rehydrated in order to bring them to the critical water content for popping.

SUMMARY OF THE INVENTION

Generally speaking, in accordance with the invention, a mixture is prepared of corn kernels with shortening, lipophilic surfactant, water and the flavoring ingredient which can be salt, sugar or cheese.

The key to obtaining uniform flavoring of all of the kernels as the same are popped is the use of water, which as will be clear from the discussion which follows is used in a fairly substantial amount. Prior to the present invention it was always considered by the experts in the field that water would be harmful in corn popping, and steps were always taken to avoid the presence of water as much as possible, as explained above. Contrary thereto I have found that not only is water desirable when used in compositions of the type described herein, but that it is actually necessary to achieve uniform coating of the popcorn with the desired flavoring particularly in the case of cheese and candy flavoring. Of course, the water is used with a shortening and a lipophilic surfactant so that a water-in-oil type emulsion of the shortening is obtained which carries with it and uniformly coats the popcorn not only with the shortening but also with the flavoring, e.g. salt, sugar, cheese, chocolate, fruit flavors, etc.

It is accordingly a primary object of the present invention to provide new popcorn compositions which permit flavoring of the popcorn as the corn is popped, without the need to flavor the corn afterwards.

It is a further object of the present invention to provide compositions which permit the obtaining of popcorn uniformly flavored with shortening and salt, or with sugar or with cheese or candy flavor, or the like.

It is yet a further object of the present invention to provide popcorn compositions which can be popped in the home and which directly upon popping are uniformly flavored.

Other objects and advantages of the present invention will be apparent from a further reading of the specification and of the appended claims.

With the above and other objects in view, the present invention mainly comprises as a composition for corn popping, corn kernels plus an emulsion of the flavoring, shortening, water and a lipophilic surfactant.

According to one embodiment of the invention, the corn kernels can be coated with the emulsion of the flavoring, shortening, water and surfactant. The coating is achieved by a normal tablet coating procedure in which the corn kernels are rotated in a coating pan along with the emulsion.

According to another embodiment to the invention, particularly where the popcorn is to be made in the home in the aluminum containers of the type described previously, the corn kernels are not uniformly coated with emulsion, but the emulsion is merely mixed therewith. Substantially similar flavoring results can be obtained in this way, however, larger amounts of the emulsion, and larger amounts of the flavoring portion of the emulsion may be used than in the case of the individual coating of the corn kernels.

In the case of coated corn kernels, for salted popcorn, the proportions of the components, other than the corn kernels are generally as follows:

| | Percent by weight |
|---|---|
| Shortening | 50–60 |
| Water | 5–10 |
| Lipophilic surfactant | 7–12 |
| Salt | 20–30 |

The ratio of corn to the above emulsion, for the coating of the corn is about 100 parts of corn to about 20–40 parts of the emulsion. All parts are by weight.

In the case of sweetened popcorn, all of the proportions are substantially as indicated above, except that the salt is replaced by sugar, and the amount of sugar is about 30–35% of the emulsion.

In the case of candy flavored popcorn, the ratios are substantially the same as for the sweetened popcorn given above, except that some of the sugar may be replaced by the candy flavor, e.g. chocolate, (preferably in the form of chocolate liqueur), maple, butterscotch, strawberry, cherry, cinnamon, etc.

In the case of a cheese flavored popcorn, the proportions of the components remain about the same with two exceptions. The salt is partly replaced by cheese, the amount of which is about 15–25% by weight, and the amount of lipophilic surfactant is reduced to about 3–10% by weight.

In the case of simple mixing of the corn kernels with the emulsion, rather than individual coating of the corn kernels, the proportions of the components, other than the corn, are as follows:

Sweetened popcorn

| | Percent |
|---|---|
| Shortening | 15–35 |
| Sugar | 45–70 |
| Water | 8–18 |
| Lipophilic surfactant | 0.5–4 |

For candy flavoring, a small amount (0.5–1%) of flavoring is added to the basic mix above.

Cheese flavored popcorn

| | Percent |
|---|---|
| Cheese | 20–30 |
| Shortening | 40–60 |
| Water | 6–22 |
| Surfactant | 0.5–5 |
| Salt | 8–15 |

In all of the above compositions, the amount of emulsion mixed with the amount of kernels will vary widely depending upon the particular type of flavored popcorn to be produced. In the case of the sweetened popcorn, the preferred proportion is about 50–100 parts of emulsion to about 25–50 parts of corn kernels, most preferably 70 parts of emulsion to about 35 parts of kernels; in the case of the cheese flavored popcorn the preferred amount is about 80–100 parts of corn kernels to about 60–80 parts of emulsion.

The compositions can of course have ordinary preservatives such as sodium benzoate added thereto, as well as coloring agents, e.g. turmeric, dyes, etc.

In accordance with the present invention, the above mixtures are formed into water-in-oil emulsions due to the action of the lipophilic surfactant. For some reason which is not entirely known, which may be due to the fact that the water is dispersed in the oil in accordance with the present invention, the water which is present in the composition, and which is actually essential in order to permit uniform distribution of the flavoring on the popcorn, does not adversely affect the corn kernels so that the kernels pop in normal manner and become coated with the flavorings contained in the emulsion. Thus, the heating of the corn kernels and emulsion result not only in popping of the corn but also in breaking up of the water-in-oil emulsion so that the oil becomes separated from the other ingredients and the kernels become coated with the flavoring, e.g. cheese, sugar and candy flavor.

The emulsion which is produced of the compositions set forth above is preferably in a plaste-like semi-solidified form, which is then mixed with the kernels, and it is during heating, as explained above, that this paste-like emulsion breaks up, the oil separating and actually covering the bottom of the container to prevent burning of the kernels and other ingredients therein, and all of the ingredients coating the resulting popped corn.

The invention is of course applicable to the use of all types of shortenings, including butter, hydrogenated vegetable oil, untreated vegetable fat, etc. The only requirement is that the shortening be edible. The taste requirements are determined by pretesting.

When referring to sugar, it is to be understood that not only can ordinary cane sugar be used, but actually any natural sweetening agent can be used, such as brown sugar, honey, etc. Powdered confectioners sugar is preferred. It is also possible to use mixtures of the natural sweetening agents, such as some white sugar and some brown sugar, or some white sugar and some honey, or some white sugar and some brown sugar and maple sugar, or some white sugar, brown sugar and honey. This is done according to taste, and as long as the other conditions of the invention are met, the results will be substantially the same, except for the desired variation in taste.

Likewise, with respect to the cheese, all types of cheese may be used, such as cheddar cheese, American cheese, provolone, romano, Swiss cheese, parmesan, etc.

The only requirement of the surfactant is that the same be edible and suitable for forming water-in-oil emulsions. All edible and highly lipophilic surfactants can thus be used for this purpose.

Although there may be a large group of such surfactants from the theoretical standpoint, as a practical matter the number of available surfactants of this type is limited because only surfactants which have been approved by the Food and Drug Administration can be used. Thus, any surfactant which is highly lipophilic (oil soluble or dispersible and capable of forming water-in-oil emulsions) and which are edible and approved for internal use. Non-ionic emulsifiers, which provide maximum stability in the presence of electrolytes, and even acidic or alkaline conditions which can occur in the case of lemon flavoring or chocolate flavoring, respectively, are most suitable.

In general, the available substances of this type are esters of polyhydric alcohols such as glycerine, polyglycols, etc., with fatty acids such as oleic acid, stearic acid, cottonseed oil, etc. These products are commercially available under the trade name of "Atmul" produced by Atlas Chemical Industries. The Atmul products are esters of monoglycerides and diglycerides of vegetable fatty acids and possess a low Hydrophile-Lipophile Balance (HLB) in a range of 2.5 to 5. The low HLB balance indicates a high degree of lipophilic properties. These products are edible and permitted for foodstuffs and meet all of the requirements indicated above. The most preferred product is Atmul 124 which consists of mono- and di-glycerides of edible fats or oils, in the form of white solid beads. It has a HLB of 3.5 an iodine value of less than 2 and a melting range of 139–143° F.

DESCRIPTION OF PREFERRED EMBODIMENTS

The following examples are given to further illustrate the present invention. The scope of the invention is not, however, meant to be limited to the specific details of the examples.

EXAMPLE 1

55 parts by weight of hydrogenated vegetable oil, 7 parts by weight of water, and 10 parts by weight of Atmul 124 which is sold by Atlas Chemical Industries Inc. of Wilmington, Del. and is mono and diglycerides of edible fats or oils conforming to Food Chemicals Codex specifications for mono and diglycerides (lipophilic surfactant) are mixed in a kettle and heated to about 80° C. The mixture is stirred until room temperature, after which 28 parts by weight of salt are stirred in. The mixture is stirred until somewhat solidified.

100 parts by weight of corn kernels are placed in a rotating pan of the type used for tablet coating, and 35 parts by weight of the above emulsion are added thereto. The pan is rotated until the kernels are uniformly coated. For best results a small amount of calcium phosphate is introduced into the pan to act as anti-sticking agent.

The coated kernels when heated in a closed container for popping purposes provide uniformly fatted and salted popcorn.

When the popping is carried out in a closed aluminum pan with an expansible aluminum top, of the type previously discussed, uniformly flavored popcorn is obtained.

EXAMPLE 2

The same procedure is followed as in Example 1, except that the amount of shortening used is 50 parts by weight and instead of the salt 33 parts by weight of sugar are used.

The resulting popcorn is uniformly sweetened.

EXAMPLE 3

The same procedure is followed as in Example 2, except that 30 parts of white sugar, 3 parts of brown sugar and 0.5 part of turmeric are used.

The resulting popcorn is sweet and has a pleasant brownish appearance.

EXAMPLE 4

The same procedure is followed as in Example 1, except that cheddar cheese is used instead of the salt.

The resulting popcorn is deliciously cheese flavored.

EXAMPLE 5

25 parts of hydrogenated vegetable oil, 60 parts of powdered cane sugar, 12.5 parts of water, and 2.5 parts of Atmul 124, plus 0.5 part of yellow coloring and sodium benzoate as preservative are blended in a kettle. The blending is carried out by mixing all of the ingredients except the sugar in a mixer and heating to about 75–85° C. until a uniform mixture is obtained. It is then stirred at slow speed until the temperature falls to 40–50° C. and the sugar is blended in and stirred without further heating at low speed until a paste-like, semi-solidified emulsion is obtained.

70 parts of the paste-like emulsion are mixed with 35 parts of corn kernels in an aluminum pan which is then closed with an expansible top.

Heating of the pan, preferably while shaking with a back and forth motion results in popping of the corn as the foil aluminum top expands, the resulting popped corn being uniformly sweetened.

EXAMPLE 6

The same procedure is followed as in Example 5, except that 55 parts of hydrogenated vegetable oil is used, along with 5 parts of Atmul 124, 25 parts of water and 15 parts of salt are used instead of the sugar.

The resulting popcorn is uniformly salted.

EXAMPLE 7

The same procedure is followed as in Example 5, except that the following composition is used:

| | Parts by weight |
|---|---|
| Cheddar cheese | 27.5 |
| Hydrogenated vegetable shortening | 55 |
| Salt | 8.5 |
| Water | 6.5 |
| Atmul 124 | 2.5 |

The emulsion is mixed with corn kernels in a ratio of 40 parts mix to 45 parts kernels. The resulting popcorn has a recognizable cheddar cheese flavor.

EXAMPLE 8

The same procedure is followed as in Example 5, except that the following composition is used:

| | Parts |
|---|---|
| Confectioners sugar | 58 |
| Hydrogenated vegetable shortening | 20.5 |
| Chocolate liqueur | 8 |
| Water | 12 |
| Atmul 124 | 1.50 |

Sodium benzoate is added as preservative, and salt and vanillin are added to taste.

The resulting popcorn has a delicious chocolate candy taste.

Other candy-flavored popcorn can be prepared by adding to the basic sugar mix of Example 5 a small amount of the desired candy flavor, e.g. maple flavor, butterscotch, strawberry, cherry, cinnamon, etc. The flavor should not be added until the mix is in the mixer in order to avoid the high temperature during the original emulsification process.

While the invention has been described in particular with respect to certain specific compositions for obtaining certain different flavored popcorns, it is apparent the variations and modifications of the invention can be made without departing from the spirit or scope of the invention.

What is claimed is:

1. Composition for producing uniformly flavored popped corn, said composition comprising corn kernels and a water-in-oil emulsion of flavoring agent, shortening, water and an edible lipophilic surfactant, said water-in-oil emulsion and the components thereof being present in amounts sufficient to coat said corn kernels upon popping of the same.

2. Composition according to claim 1 wherein the corn kernels are coated with the emulsion and wherein the flavoring agent is salt, said emulsion containing 50–60% by weight shortening, 5–10% by weight water, 20–30% by weight salt, and 7–12% by weight lipophilic surfactant, the ratio of corn kernels to emulsion being about 100 parts corn to about 20–40 parts of emulsion.

3. Composition according to claim 1 wherein the corn kernels are coated with the emulsion and wherein the flavoring agent is sugar, said emulsion containing 50–60% by weight shortening, 5–10% by weight water, about 30–35% by weight sugar, and 7–12% by weight lipophilic surfactant, the ratio of corn kernels to emulsion being about 100 parts corn to about 20–40 parts of emulsion.

4. Composition according to claim 3 wherein the sugar is a mixture of white sugar and brown sugar.

5. Composition according to claim 2 wherein the salt is partially replaced by cheese which is present in the emulsion in an amount of about 15–25% by weight, and wherein the amount of lipophilic surfactant is about 3–10% by weight.

6. Composition according to claim 1 wherein the corn kernels are mixed with the emulsion and the flavoring agent is sugar, wherein the proportions of emulsion are about 15–35% shortening, about 45–70% sugar, about 8–18% water and about 0.5–4% lipophilic surfactant, the ratio of corn kernels to emulsion being about 25–50 parts corn kernels to about 50–100 parts emulsion.

7. Composition according to claim 6 wherein the sugar consists of a mixture of white sugar and brown sugar.

8. Composition according to claim 6 wherein about 5–8% of the sugar is replaced by about the same amount of chocolate liqueur so as to provide a chocolate-flavored product.

9. Composition according to claim 6 wherein a small amount of candy flavoring is added to provide a candy-flavored product.

References Cited

UNITED STATES PATENTS

| 2,222,560 | 11/1940 | Clickner. | |
| 2,518,247 | 8/1950 | Nairn | 99—81 |
| 2,648,610 | 8/1953 | Martin. | |
| 3,556,815 | 1/1971 | Fujiwara | 99—83 X |

RAYMOND N. JONES, Primary Examiner